United States Patent
Mahon et al.

(10) Patent No.: US 11,912,085 B2
(45) Date of Patent: Feb. 27, 2024

(54) DROP DECK TRAILER

(71) Applicant: David Mahon, Las Vegas, NV (US)

(72) Inventors: David Mahon, Las Vegas, NV (US); Scott Mann, Las Vegas, NV (US)

(73) Assignee: David Mahon, Las Vegas, NV (US)

( * ) Notice: Subject to any disclaimer, the term of this patent is extended or adjusted under 35 U.S.C. 154(b) by 0 days.

(21) Appl. No.: 18/070,510

(22) Filed: Nov. 29, 2022

(65) Prior Publication Data
US 2023/0191866 A1 Jun. 22, 2023

Related U.S. Application Data

(60) Provisional application No. 63/291,661, filed on Dec. 20, 2021.

(51) Int. Cl.
| | | |
|---|---|---|
| *B60G 17/015* | (2006.01) | |
| *B60G 9/02* | (2006.01) | |
| *B60G 7/00* | (2006.01) | |
| *B60P 1/43* | (2006.01) | |
| *B62D 63/08* | (2006.01) | |
| *B60S 9/04* | (2006.01) | |
| *B60D 1/54* | (2006.01) | |
| *B60S 9/10* | (2006.01) | |
| *B60P 3/07* | (2006.01) | |

(52) U.S. Cl.
CPC .......... *B60G 17/0152* (2013.01); *B60D 1/54* (2013.01); *B60G 7/001* (2013.01); *B60G 9/02* (2013.01); *B60P 1/433* (2013.01); *B60S 9/04* (2013.01); *B62D 63/08* (2013.01); *B60D 2001/546* (2013.01); *B60P 3/07* (2013.01); *B60S 9/10* (2013.01)

(58) Field of Classification Search
CPC ...... B60G 17/0152; B60G 7/001; B60G 9/02; B60D 1/54; B60D 2001/546; B60P 1/433; B60P 3/07; B60S 9/04; B60S 9/10; B62D 63/08
See application file for complete search history.

(56) References Cited

U.S. PATENT DOCUMENTS

| | | | | |
|---|---|---|---|---|
| 4,730,974 A | * | 3/1988 | Andre | ...................... B60P 1/433 414/346 |
| 8,388,017 B2 | * | 3/2013 | Alexander | ........... B62D 63/061 280/763.1 |

(Continued)

OTHER PUBLICATIONS

Pro Sport Trailer of Choice for Classic Car Owners, Futura Trailers, 2022.

*Primary Examiner* — Paul N Dickson
*Assistant Examiner* — Shams Dhanani
(74) *Attorney, Agent, or Firm* — Bayramoglu Law Offices LLC

(57) ABSTRACT

The application discloses a Drop Deck Trailer having a pivoting axle system that allows the deck of the trailer to be incrementally lowered to the ground. When coupled to a tow vehicle, the partially lowered deck becomes a ramp to load and unload a vehicle. The unloaded trailer can be backed into a standard garage, uncoupled, and lowered completely to the ground. The UTV or light vehicle can then be front-loaded on the trailer. This capability allows the convenience and cost savings of simultaneously storing a UTV or other light vehicle in the same standard garage space. A unique articulated tongue assembly allows the operator to minimize the footprint of the parked trailer, allowing smaller spaces to be used for storage or simply eliminate a trip hazard. The Drop Deck Trailer is a combination of innovative features that provides convenience and cost savings.

17 Claims, 10 Drawing Sheets

(56) References Cited

U.S. PATENT DOCUMENTS

| | | | |
|---|---|---|---|
| 10,369,917 B2* | 8/2019 | Reid | B60P 1/08 |
| 11,370,343 B2* | 6/2022 | Hoehner | B62D 53/062 |
| 2005/0067799 A1* | 3/2005 | Smith | B60P 1/027 |
| | | | 280/6.151 |
| 2016/0257237 A1* | 9/2016 | Dagenais | B60P 1/433 |
| 2016/0325667 A1* | 11/2016 | Pratt | B60P 1/02 |
| 2020/0156427 A1* | 5/2020 | Schutt | B60G 7/008 |
| 2020/0391644 A1* | 12/2020 | Cochet | B60P 3/06 |

* cited by examiner

DROP DECK TRAILER

CROSS-REFERENCE TO RELATED APPLICATIONS

This application claims priority to U.S. Provisional Application No. 63/291,661, filed on Dec. 20, 2021, which is entirely incorporated herein by reference.

TECHNICAL FIELD

The present invention relates to the field of trailers, specifically to a drop deck trailer used to tow different vehicles including Utility Terrain Vehicles (UTV).

BACKGROUND

Power sports enthusiasts commonly use tandem axle car haulers and utility trailers to transport different vehicles including UTVs. Folding or removable ramps are typically required to load and unload vehicles.

The combined trailer deck and vehicle heights exceed the height of standard garages. This precludes a vehicle loaded on a trailer from being stored together or in unison in a conventional garage. Homeowners Associations often have regulations restricting parked trailers. Trailers and recreational vehicles may have to be stored at storage facilities, adding cost and inconvenience.

Tandem axle car haulers and utility trailers repurposed for UTV transport are not tailored to the growing power sport industry. Tandem axle trailers are expensive and overrated for the load rating requirements of typical 4-place UTVs. Conversely, utility trailers may be underrated in load capacity and present a hazard.

Ramp systems vary in design. Removable ramps are bulky, and a potential source of injury. Hinged ramps can cause parasitic drag underway and reduce tow vehicle fuel economy. Both designs require additional time to properly load and secure a vehicle.

UTV trailers are often an unconsidered significant secondary expense when relegated to off-site rental storage facilities. Monthly storage fees can quickly accrue and exceed the value of the trailer. Outdoor storage can also cause trailers to prematurely deteriorate and depreciate in value. Owners must also contend with the logistics of retrieving trailers from storage.

Popular car haulers and utility trailers do not have the added functionality of providing access to vehicle undercarriages, such as that provided by an auto lift, for UTV and light vehicle owners who prefer to perform their own maintenance. Full coverage decking does not allow the convenience of working safely under vehicles.

There are no existing, purpose-built, 4-place UTV trailers that can be stored together with the vehicle in a standard-size garage and allow the added convenience of ramp-free loading and undercarriage access for maintenance and repairs.

Available drop deck trailers do not permit front loading. Most do not completely lower to the ground, presenting the aforementioned storage dilemma.

SUMMARY

To solve the problems mentioned above, this application discloses a Drop Deck Trailer having a linear actuator actuated pivoting axle system that allows the deck of the trailer to be incrementally lowered completely to the ground. When coupled to a tow vehicle, the deck may be partially lowered, namely the rear portion of the deck, so the deck becomes a ramp that a vehicle can easily drive onto. The unloaded trailer can be backed into a standard garage, uncoupled, and lowered completely to the ground, permitting the front loading of a vehicle onto the trailer within the standard garage space. This capability allows the convenience and cost savings of simultaneously storing a trailer with a vehicle, such as a UTV or light automobile.

Open center decking may be useful to those inclined to perform their own cost-saving vehicle maintenance by providing easy access to the undercarriage of a loaded vehicle through the opening between the decks.

A unique folding tongue assembly may allow the footprint of the parked trailer to reduce to the size of the deck perimeter, eliminating the protruding tongue as a trip hazard for seasonal enthusiasts who intend to store their trailer and vehicle for extended periods.

Existing cable-wench and air bagged drop deck trailers are exclusively rear loading and must be pulled into a garage tongue first so a vehicle can be parked on the trailer deck. Tilt deck trailers similarly only facilitate ramp free loading. The unique designs according to exemplary embodiments of the present application have fully retractable wheels that allow the entire frame to lower to the ground, unlike existing drop deck trailers that only lower the rear deck to ground level to allow ramp free loading. The front of the trailer and tongue of the exemplary embodiments are unique in that they allow unimpeded front loading, with the tongue either extended or retracted, when the trailer frame is completely on the ground.

A trailer in accordance with exemplary embodiments of the present application may integrate various features that make it unique and purpose-built for transporting and storing UTVs and light automobiles. The design may provide conveniences that are an advantage over conventional trailers and other drop deck designs.

REFERENCE DESIGNATORS

Figure 1:
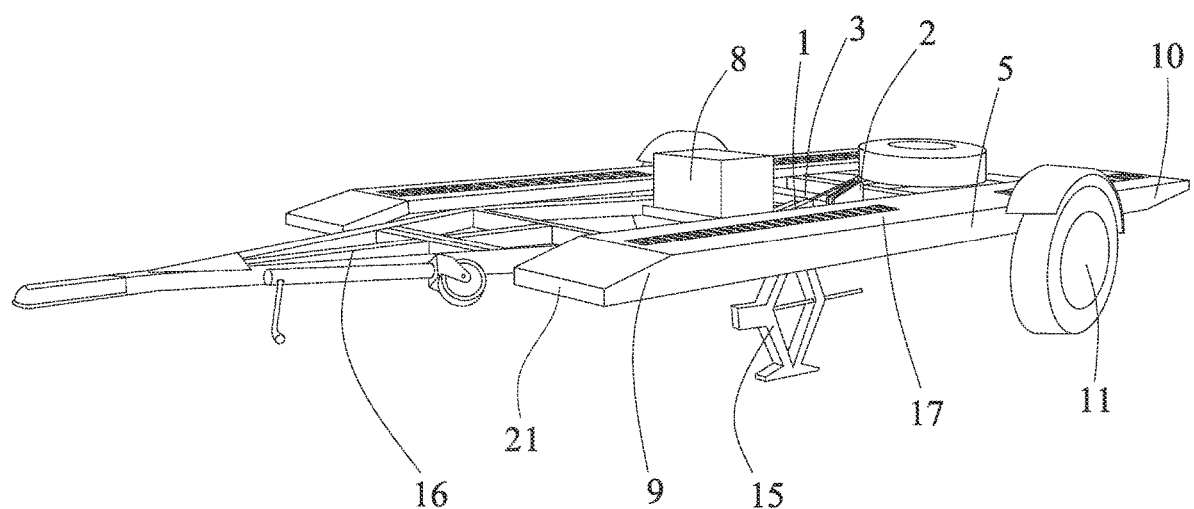
FIG. 1 shows the trailer of an exemplary embodiment.

1 Electrohydraulic actuator
2 Actuator lever arm
3 Torsion axle
4 Sleeved bushing
5 Beam
6 Swing arm
7 Wheel hub
8 Battery box with controllers and accessories 9 Front loading ramp
10 Rear loading ramp
11 Wheel
12 Decking support framing
13 Removable through bolt
14 Barrel hinge
15 Automated scissor jack
16 Articulated tongue assembly with coupler
16A Extended articulated tongue assembly
16B Retracted articulated tongue assembly
17 Decking
18 Reinforcing plate welded to articulated tongue assembly frame with coupler
20 Reinforcing plate welded to trailer frame
21 Trailer frame
22 Warning horn
23 110V battery trickle maintainer
24 12V battery
25 4 function RF controller
26 Towed vehicle battery maintainer
27 Battery disconnect switch
28 Reversing solenoid relay switch for scissor jacks
29 Circuit breaker
30 Reversing solenoid relay switch for electrohydraulic actuators
31 7 wire trailer wiring junction box

DETAILED DESCRIPTION

Figure 2:
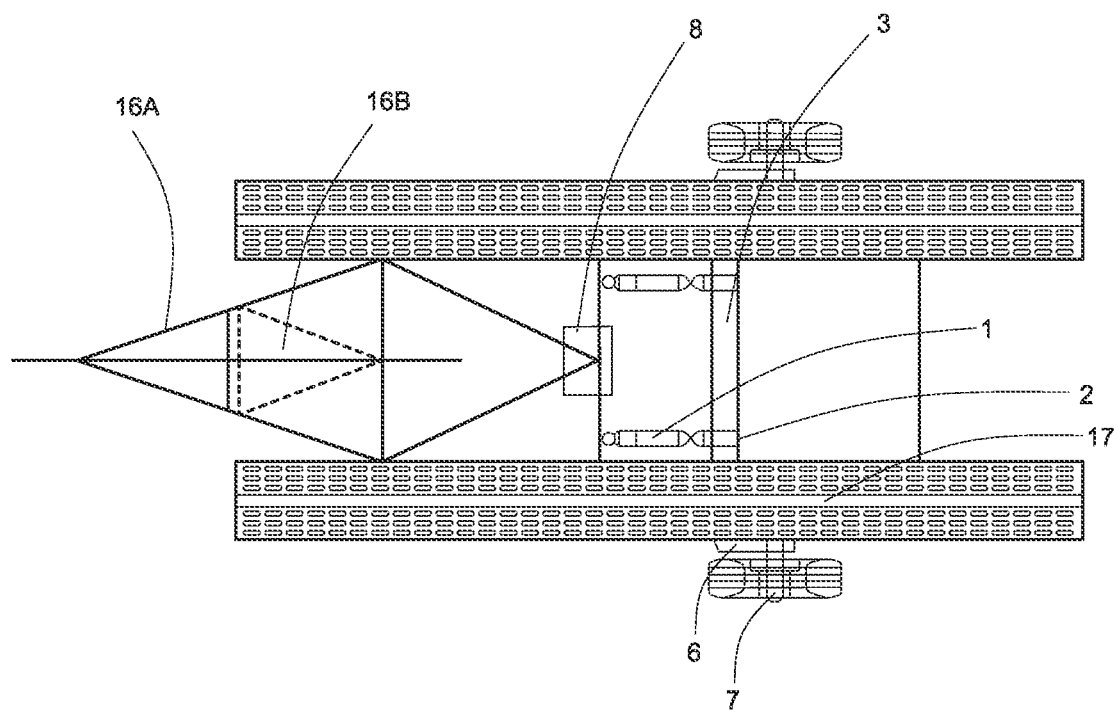
FIG. 2 shows top view schematic of the trailer of an exemplary embodiment.

FIGS. 1 and 2 shows an exemplary embodiment of a trailer. The trailer is comprised of a frame 21 with two main weight bearing beams 5, a pivoting axle system comprising an axle 3 and swing arms 6, wheel hubs 7, and an articulated tongue assembly 16. The swing arms 6 are attached to wheels and to the axle 3 so that the axle 3 pivots under the influence of at least one linear actuator 1. The axle in this exemplary embodiment is a torsion axle 3, which is only one example of the axle that can be employed in the pivoting axle system. It should be understood that other axles, such as, for example, torsion bars, can be employed as the axle of the pivoting axle system. In one exemplary embodiment, the torsion axle 3 can be rated for 4500 pounds for UTVs. However, it should be understood that the torsion axle 3 can be rated for any weight appropriate for the vehicle, and pivoting axle systems may be installed in tandem to further increase weight rating. In addition, the trailer need not be limited to UTVs but can be employed for other types of vehicles, including passenger cars, for example. The main weight bearing beams 5 bear weight on torsion axle 3 through welded sleeved bushings 4. Deck support framing 12 may support decking 17 at intervals appropriate for the load rating of the material of the decking. For example, in one embodiment, a 3/16-inch-thick aluminum diamond plate may be supported every 18 inches. The beams 5 and the support framing 12 can be made from a metallic material, such as, for example, a steel material, an aluminum material and/or any other metal material.

As indicated above, the trailer further includes linear actuators 1, which, in this example, are electrohydraulic actuators 1. However, it should be understood that other linear actuators, such as, for example, hydraulic cylinders, air bags, air over oil cylinders, or jackscrews, can be employed. The electrohydraulic actuators 1 are configured to rotate the axle or axle tube of the pivoting axle system through an arc sufficient to retract wheels 11 mounted to swing arms 6. The wheels may be raised relative to the trailer frame incrementally from a fully lowered tow position, to a second position to lower the deck to a desired height.

FIG. 2 shows a top view schematic of the trailer in accordance with an exemplary embodiment. The articulated tongue assembly 16 may have a tongue that is in a retracted position 16B or extended position 16A rotating about a hinge 14. Decking 17 may be spaced to match the vehicle wheel track and provide undercarriage access to perform mechanical work. Battery box 8 and electrohydraulic actuators 1 are configured to allow adequate clearance for towed vehicle to drive over.

Figure 3:
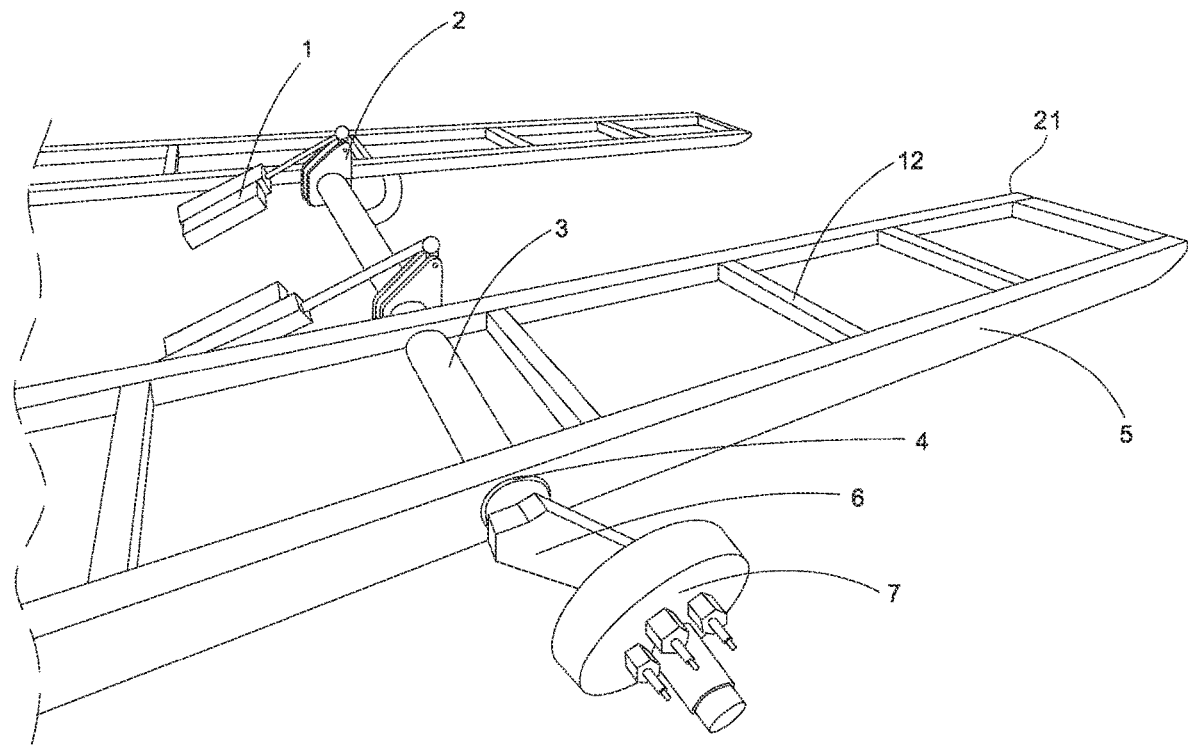
FIG. 3 shows the hydraulic mechanism to raise and lower the trailer deck.

FIG. 3 shows an exemplary mechanism employed to raise and lower the trailer deck in this embodiment. The rod of the electrohydraulic actuator 1 may be connected to the axle tubing of torsion axle 3 by a welded lever arm and the hydraulic actuator base connected to the trailer frame by a hinged mounting attachment. As understood by those of ordinary skill in the art, the torsion axle 3 is composed of a torsion axle tube, an inner steel bar and rubber cords inside the torsion axle tube. The square torsion axle tube transitions through sleeved bushing 4 welded into a hole through beam 5. Alternatively, interconnected torsion bars may be substituted for the torsion axle. Swing arm 6 may be connected by weld or clamp to a splined or square inner steel bar of the torsion axle 3 and similarly connected to wheel hub 7 mounted to wheel 11. When the torsion axle tube is rotated, swing arms 6 raise and lower wheels 11, lowering and raising the deck height from a fully suspended tow position to a completely flat, ground position, and all increments in between. Extending electrohydraulic actuator 1 raises the trailer deck and retracting electrohydraulic actuator 1 lowers the trailer deck. In some embodiments, electrohydraulic actuator 1 may be a different type of linear actuator, for example, an actuator that is driven by a motor. For example, the motor can be a jack screw or a compressor, such as, for example, an airbag mechanism. In some embodiments, each of a plurality of actuators can be the same or a different type of actuator, such as one actuator being an electrohydraulic actuator and another actuator can be a motor-driven actuator. When there is a single or plural actuator and whether they are the same or different types of actuators, battery or batteries in utility box 8 may provide the necessary power for the actuator(s) to work properly.

Figure 4:
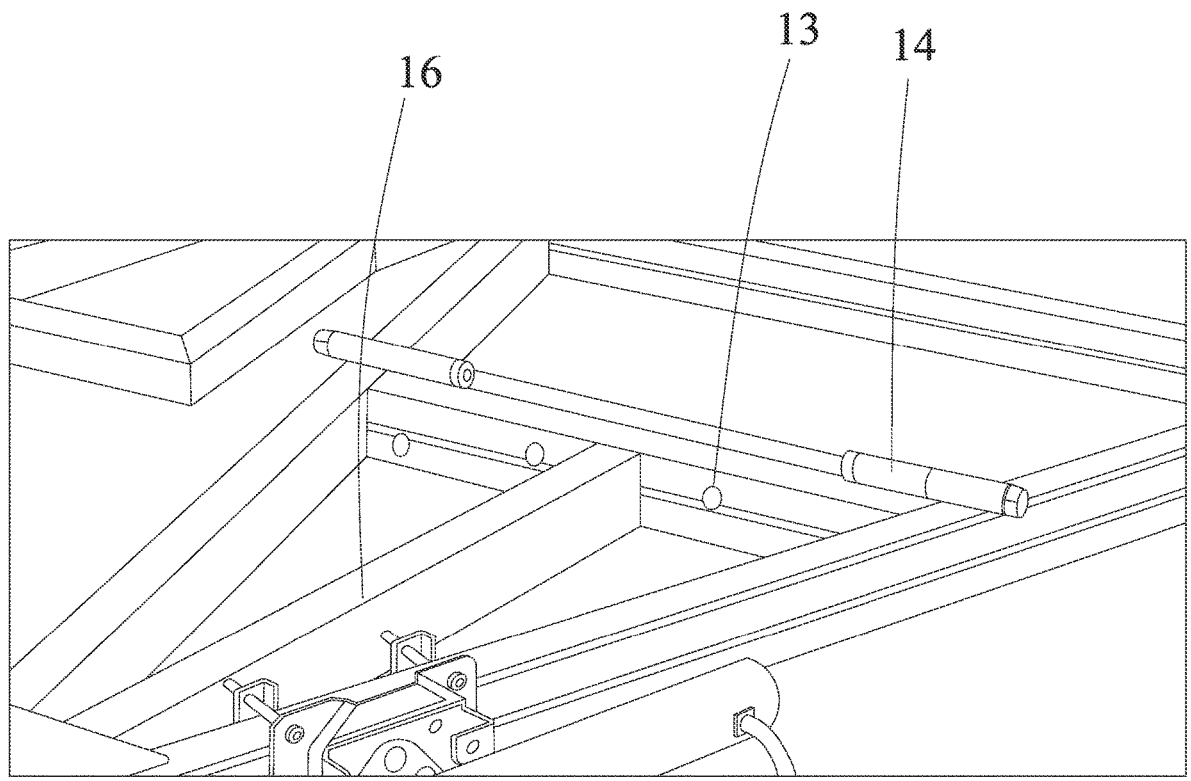
FIG. 4 shows the components of an articulated tongue assembly in a first embodiment of the assembly.
Figure 5:
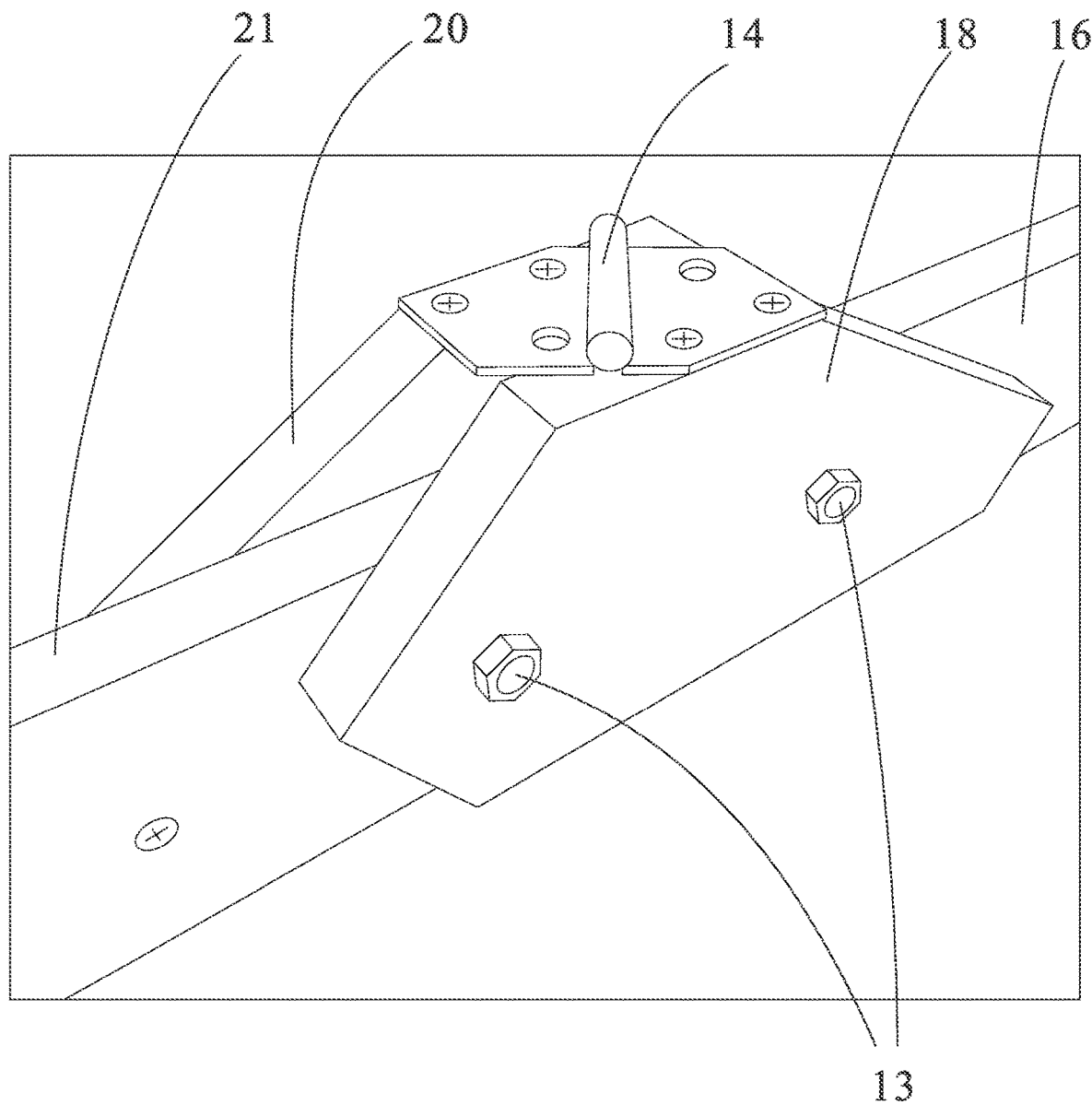
FIG. 5 shows the components of an articulated tongue assembly in a second embodiment of the assembly.

FIG. 4 shows the components of an exemplary articulated tongue assembly 16. It should be understood that, although the tongue assembly 16 is preferred, in alternative embodiments, a fixed, non-retractable tongue can be employed. The tongue assembly with coupler 16 is articulated by two barrel hinges 14 and secured in tow position with through bolts 13. The tongue assembly at the front of the frame can pivot around tongue assembly hinge axis such that articulated tongue assembly 16 can rest on trailer frame 16B, as shown in FIG. 2. The tongue is secured with a number (e.g., 4) of staggered through bolts 13 in the extended tow position 16A. FIG. 5 details an alternative design with separate reinforcing plates welded to trailer frame and tongue frame connected by the barrel hinge. Alternatively, heavy duty load binders could be used to lock the extended articulated tongue assembly 16A in tow position. Removing the bolts allows the hinged tongue to fold 180 degrees over the trailer frame. This effectively minimizes the overall footprint of the trailer; the retracted articulated tongue assembly 16B does not protrude from the front of the frame. In this configuration, the tongue does not present a trip hazard or obstacle that otherwise needs to be negotiated and reduces the trailer length by 20%, allowing the trailer to be stored in smaller spaces. This innovation is a unique feature of this embodiment.

In this embodiment, automated scissor jacks 15 have been installed on the front of the trailer frame to facilitate lowering the frame to the ground in lieu of a conventional tongue jack, which may impede front loading or not completely lower the tongue to the ground. Alternatively, hydraulic jacks, C-jacks or a floor jack can be utilized.

Figure 6:
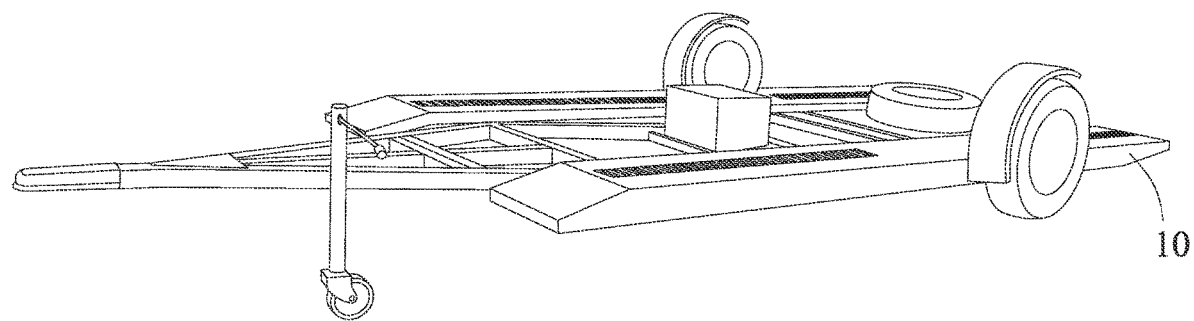
FIG. 6 shows a perspective view of the trailer partially lowered for rear loading.
Figure 7:
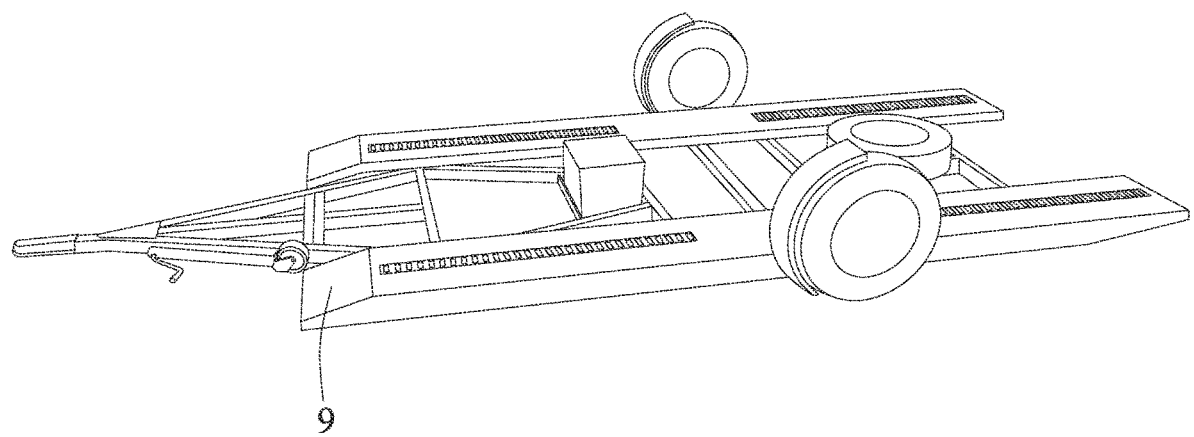
FIG. 7 shows a perspective view of the trailer completely lowered for front loading.

The two main beams 5, which may be rectangular steel tubes, may be contoured to allow the rear deck to approximate ground level when the trailer is partially lowered, as shown in FIG. 6, and the front deck to approximate the ground level when fully lowered, as shown in FIG. 7. In addition, cantilevered steel wedges or ramps can be attached to the trailer frame to further minimize the ground-ramp transition.

Figure 9:
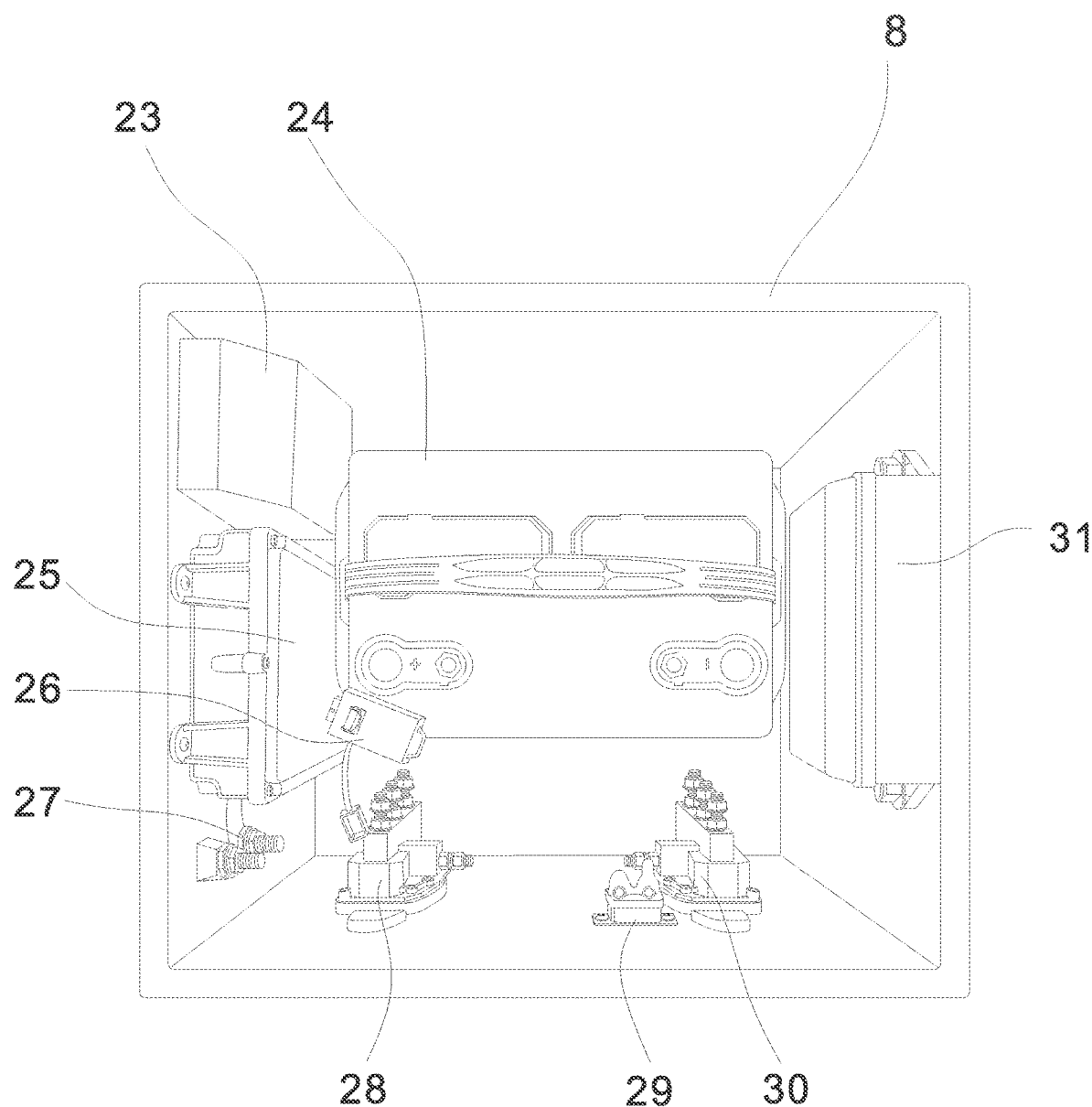
FIG. 9 shows a battery box with controllers and accessories.
Figure 10:
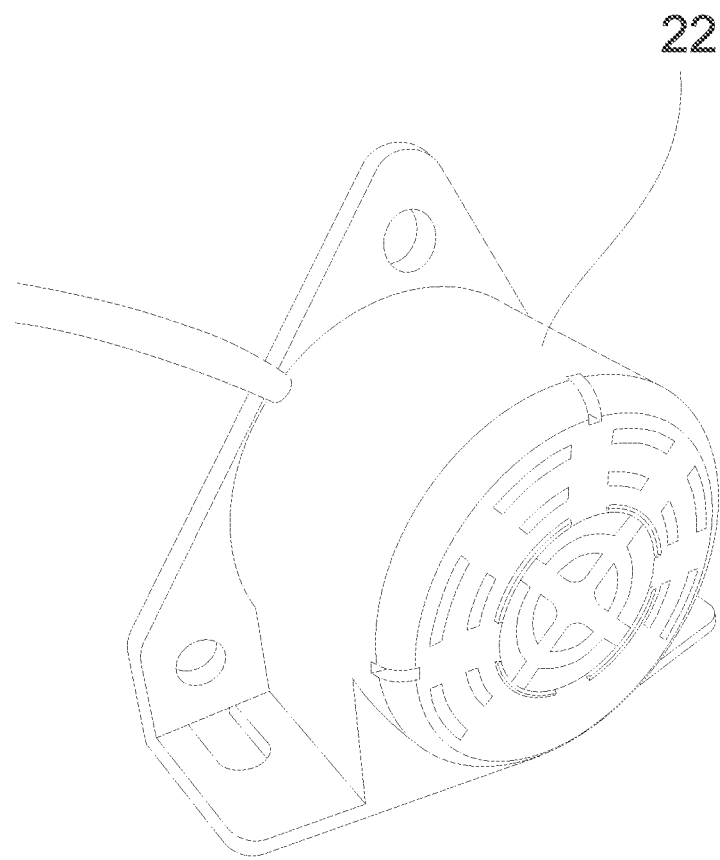
FIG. 10 shows a warning horn.

As shown in FIG. 9, battery box 8 may house a battery 24 or batteries, reversing solenoid relay switches 28 and 30 powered by a 4-function RF controller 25, 7-wire trailer wiring junction box 31, towed vehicle battery maintainer 26, and 110V battery maintainer 23. The battery may provide power to a hydraulic pump, electrohydraulic actuators, compressor or other linear actuator. The battery box 8 may include a warning horn 22 that signals the trailer is powered-on and ready to operate. A battery disconnect switch 27 shuts off the power supply.

The open, unobstructed trailer framing between the decks provides ready access to the undercarriage of loaded vehicles for maintenance and repairs. Ideally, jack stands would be placed under the main beams 5 for safety. The trailer may be equipped with Department of Transportation compliant light signals and reflectors. The wheel hubs 7 may also have electric brakes for safety.

The trailer works as follows: The operator manually turns on battery power at battery disconnect switch 27. A keyed ignition or FOB is overridden, sounding warning horn 22, to activate the hydraulic actuators or jacks. Momentary toggle controls allow the trailer deck height to be incrementally lowered and raised.

With the trailer coupled to a tow vehicle, the operator lowers the rear trailer deck to ground level, as shown in FIG. 6. A UTV or other small vehicle can be driven up the inclined deck. The deck can then be raised with the controller and the vehicle secured with appropriate tie-down straps. As shown in FIG. 6, when the position of the front of the trailer is fixed and not lowered to the ground, the back end tilts towards the ground. The tapered ends of the beams rest on the ground to form a rear loading ramp 10 so that vehicles can be loaded on the trailer. The front ends of the decks are contoured to form a front loading ramp 9 when the frame is fully lowered to the ground, as illustrated in FIG. 7. When the frame rests on the ground after fully retracting actuator(s), i.e., raising swing arms with the wheels, a vehicle can be driven up the front ramps onto the trailer. The frame and decks are configured for front and rear loading depending on the height of the trailer deck.

The unloaded trailer can be backed into a garage, and the scissor jacks can be lowered to assist in uncoupling the trailer from the tow vehicle. The scissor jacks 15 and swing arms 6 are then retracted to lower the deck completely to ground level, as illustrated in FIG. 7. Alternatively, a hydraulic floor jack may be used to lower the trailer frame to the ground. An impact driver is used to remove the articulated tongue assembly through bolts, and the tongue frame is folded over the trailer frame. The trailer is secured by disconnecting battery power. The 110V battery maintainer can be plugged into a power source to recharge the battery.

Figure 8:
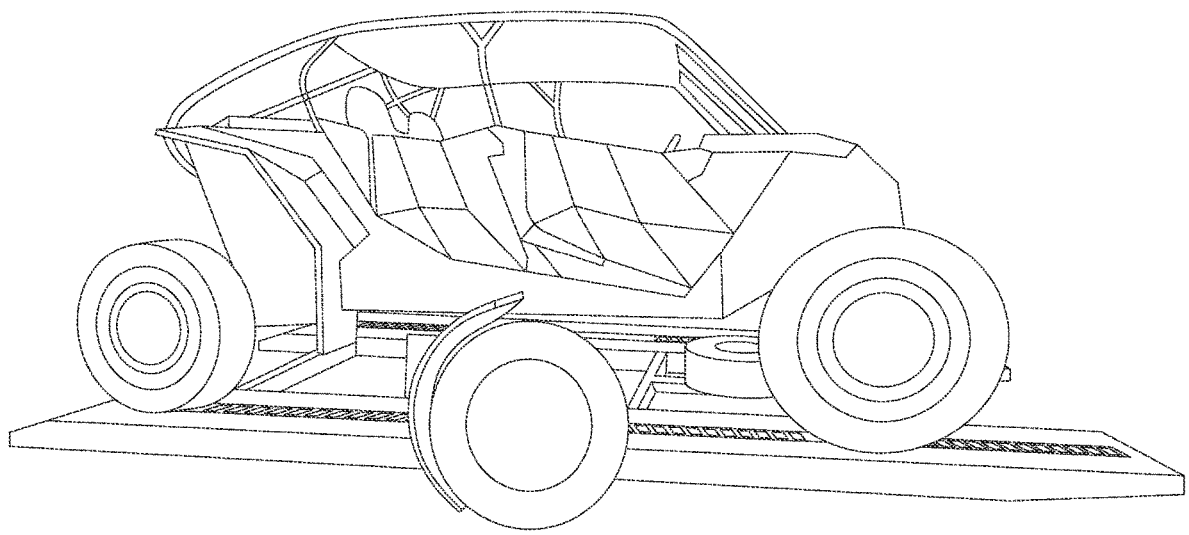
FIG. 8 shows a UTV loaded on the trailer.

A vehicle can be front-loaded onto the fully lowered trailer in a standard garage with the tongue either extended or retracted, as shown in FIG. 8.

What is claimed:

1. A drop deck trailer comprising:
   a trailer frame providing a deck;
   at least one linear actuator;
   a pivoting axle system connected to the at least one linear actuator, said pivoting axle system comprising an axle and swing arms attached to wheels and to the axle so that the axle pivots under influence of the at least one linear actuator,
   wherein the at least one linear actuator is configured to rotate the axle of the axle system to cause the wheels to incrementally lower or raise the drop deck trailer from normal ride height to complete ground level, and wherein the trailer frame has a tapered end to allow the deck to approximate the ground when partially lowered to create a rear loading ramp and a tapered end from the deck height at a front of the trailer that creates a front loading ramp when fully lowered for loading and unloading a vehicle.

2. The drop deck trailer of claim 1, wherein the axle is a torsion axle or torsion bar that provides suspension.

3. The drop deck trailer of claim 2, wherein the at least one linear actuator is connected between the trailer frame and the axle system by a lever arm, and the axle of the axle system is connected to swing arms with wheel hubs; and when the actuator is activated, the axle rotates and causes the wheels to lower or raise relative to the trailer frame.

4. The drop deck trailer of claim 3, wherein the trailer frame includes two main weight bearing beams.

5. The drop deck trailer of claim 4, wherein deck supports are located between the weight bearing beams to support decking.

6. The drop deck trailer of claim 5, wherein the weight bearing beams and deck supports are made from metallic material.

7. The drop deck trailer of claim 6, wherein the weight bearing beams bear weight on the axle system through sleeved bushings.

8. The drop deck trailer of claim 3, wherein the lever arm is activated by the at least one linear actuator.

9. The drop deck trailer of claim 8, wherein the linear actuator rotates the axle when extended or retracted.

10. The drop deck trailer of claim 9, wherein the axle connected to the swing arms raises and lowers the wheel hubs relative to the frame, lowering and raising the deck to a desired height.

11. The drop deck trailer of claim 1, further comprising an articulated trailer tongue assembly including a trailer tongue with a coupler, wherein the articulated trailer tongue assembly is hinged to fold over the trailer frame.

12. The drop deck trailer of claim 11, wherein the trailer tongue assembly is articulated by two or more hinges and secured in tow position with a locking mechanism.

13. The drop deck trailer of claim 1, further comprising a utility box to enclose automation control components including batteries and chargers, solenoids, and a wireless remote control system.

14. The drop deck trailer of claim 1, wherein the trailer frame comprises a plurality of beams and wherein said beams of the plurality of beams are separated to allow access to an undercarriage of the vehicle when the vehicle is positioned on top of the trailer.

15. The drop deck trailer of claim 1, further comprising a jack configured to facilitate lowering or raising the front of the trailer.

16. The drop deck trailer of claim 15, wherein the jack is an automated scissor jack.

17. The drop deck trailer of claim 1, wherein the tapered end at the front of the trailer ends at deck height.

\* \* \* \* \*